US010638367B2

(12) United States Patent
Faccin et al.

(10) Patent No.: US 10,638,367 B2
(45) Date of Patent: Apr. 28, 2020

(54) PRIORITIZING INCOMPATIBLE NETWORK SLICES

(71) Applicant: QUALCOMM Incorporated, San Diego, CA (US)

(72) Inventors: Stefano Faccin, San Ysidro, CA (US); Miguel Griot, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 65 days.

(21) Appl. No.: 15/902,860

(22) Filed: Feb. 22, 2018

(65) Prior Publication Data
US 2018/0270712 A1 Sep. 20, 2018

Related U.S. Application Data

(60) Provisional application No. 62/473,088, filed on Mar. 17, 2017.

(51) Int. Cl.
*H04W 28/16* (2009.01)
*H04W 76/11* (2018.01)
*H04W 48/18* (2009.01)
*H04W 48/16* (2009.01)
*H04W 36/14* (2009.01)
*H04W 72/10* (2009.01)
*H04W 60/00* (2009.01)

(52) U.S. Cl.
CPC .......... *H04W 28/16* (2013.01); *H04W 36/14* (2013.01); *H04W 48/16* (2013.01); *H04W 48/18* (2013.01); *H04W 72/10* (2013.01); *H04W 60/00* (2013.01)

(58) Field of Classification Search
CPC ..... H04W 28/16; H04W 48/18; H04W 72/10; H04W 36/14; H04W 48/16; H04W 60/00
See application file for complete search history.

(56) References Cited

U.S. PATENT DOCUMENTS

2017/0006528 A1* 1/2017 Bari ................... H04W 48/16
2018/0262979 A1* 9/2018 Wang .................. H04W 48/18
2019/0021047 A1* 1/2019 Zong .................. H04W 76/11

OTHER PUBLICATIONS

International Search Report and Written Opinion—PCT/US2018/019491—ISA/EPO—dated May 25, 2018.

(Continued)

*Primary Examiner* — Kiet Tang
(74) *Attorney, Agent, or Firm* — Patterson & Sheridan, LLP

(57) ABSTRACT

Certain aspects of the present disclosure relate to methods and apparatus for prioritizing incompatible network slices in wireless communications systems operating according to new radio (NR) technologies. An exemplary method that may be performed by a UE includes sending a request to connect to a set of network slices, wherein the request comprises at least one priority associated with at least one network slice in the set of network slices, and receiving signaling indicating a set of allowed network slices in response to the request.

32 Claims, 12 Drawing Sheets

(56) References Cited

OTHER PUBLICATIONS

LG Electronics Inc: "Discussion on the Handling of NSSAI", 3GPP Draft; S2-171049_DP_NSSAI_V2, 3rd Generation Partnership Project (3GPP), Mobile Competence Centre; 650, Route Des Lucioles; F-06921 Sophia-Antipolis Cedex; France, vol. SA WG2, No. Dubrovnik, Croatia; Feb. 13, 2017-Feb. 17, 2017, Feb. 13, 2017, XP051217171, 6 pages, Retrieved from the Internet: URL: http://www.3gpp.org/ftp/Meetings_3GPP_SYNC/SA2/Docs/ [retrieved on Feb. 13, 2017].
Qualcomm Incorporated: "Way Forward on Solutions for Key Issue 1 on Network Slicing", 3GPP Draft; S2-165762_NETSLICING_WAYFORWARDDQC_V6, 3rd Generation Partnership Project (3GPP) Mobile Competence Centre; 650, Route Des Lucioles; F-06921 Sophia-Antipolis Cedex; France, vol. SA WG2, No. Kaohsiung, Taiwan; Oct. 17, 2016-Oct. 21, 2016, Oct. 16, 2016, XP051155345, 8 pages, Retrieved from the Internet: URL: http://www.3gpp.org/ftp/Meetings_3GPP_SYNC/SA2/Docs/ [retrieved on Oct. 16, 2016].

\* cited by examiner

PRIORITIZING INCOMPATIBLE NETWORK SLICES

CROSS-REFERENCE TO RELATED APPLICATIONS

The present Application for Patent claims priority to U.S. Provisional Application No. 62/473,088, filed Mar. 17, 2017, which is assigned to the assignee of the present application and hereby expressly incorporated by reference herein in its entirety.

FIELD

The present disclosure relates generally to communication systems, and more particularly, to methods and apparatus for prioritizing incompatible network slices in wireless communications systems operating according to new radio (NR) technologies.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A networks, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, a 5G NB, an eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for prioritizing incompatible network slices in wireless communications systems operating according to new radio (NR) technologies.

Certain aspects provide a method for wireless communication by a user equipment. The method generally includes sending a request to connect to a set of network slices, wherein the request comprises at least one priority associated with at least one network slice in the set of network slices, and receiving signaling indicating a set of allowed network slices in response to the request.

Certain aspects provide a method for wireless communication by a core network entity. The method generally includes receiving a request for a user equipment (UE) to connect to a set of network slices, wherein the request comprises at least one priority associated with at least one network slice in the set of network slices, selecting a core network function that supports the at least one network slice or another network slice in the set of network slices, and communicating the request to the selected core network function.

Certain aspects provide a method for wireless communication by a core network entity. The method generally includes receiving a request for a user equipment (UE) to connect to a set of network slices, wherein the request comprises at least one priority associated with at least one network slice in the set of network slices, determining the at least one network slice or another network slice in the set of network slices can be supported by a network, based at least in part on the at least one priority, and communicating a response to the UE providing an indication of the determined at least one network slice or the other network slice.

Certain aspects provide an apparatus for wireless communication. The apparatus generally includes a processor configured to cause the apparatus to send a request to connect to a set of network slices, wherein the request comprises at least one priority associated with at least one network slice in the set of network slices, and to cause the apparatus to receive signaling indicating a set of allowed network slices in response to the request, and a memory coupled with the processor.

Certain aspects provide an apparatus for wireless communication. The apparatus generally includes a processor configured to cause the apparatus receive a request for a user equipment (UE) to connect to a set of network slices, wherein the request comprises at least one priority associated with at least one network slice in the set of network slices, to select a core network function that supports the at least one network slice or another network slice in the set of network slices, and to communicate the request to the selected core network function, and a memory coupled with the processor.

Certain aspects provide an apparatus for wireless communication. The apparatus generally includes a processor configured to cause the apparatus to receive a request for a user equipment (UE) to connect to a set of network slices, wherein the request comprises at least one priority associated with at least one network slice in the set of network slices, to determine the at least one network slice or another network slice in the set of network slices can be supported by a network, based at least in part on the at least one priority, and to cause the apparatus to communicate a response to the UE providing an indication of the determined at least one network slice or the other network slice, and a memory coupled with the processor.

Certain aspects provide an apparatus for wireless communication. The apparatus generally includes means for sending a request to connect to a set of network slices, wherein the request comprises at least one priority associated with at least one network slice in the set of network slices, and means for receiving signaling indicating a set of allowed network slices in response to the request.

Certain aspects provide an apparatus for wireless communication. The apparatus generally includes means for receiving a request for a user equipment (UE) to connect to a set of network slices, wherein the request comprises at least one priority associated with at least one network slice in the set of network slices, means for selecting a core network function that supports the at least one network slice or another network slice in the set of network slices, and means for communicating the request to the selected core network function.

Certain aspects provide an apparatus for wireless communication. The apparatus generally includes means for receiving a request for a user equipment (UE) to connect to a set of network slices, wherein the request comprises at least one priority associated with at least one network slice in the set of network slices, means for determining the at least one network slice or another network slice in the set of network slices can be supported by a network, based at least in part on the at least one priority, and means for communicating a response to the UE providing an indication of the determined at least one network slice or the other network slice.

Certain aspects provide a computer readable medium including instructions. The instructions, when executed by a processing system, cause the processing system to perform operations generally including sending a request to connect to a set of network slices, wherein the request comprises at least one priority associated with at least one network slice in the set of network slices, and receiving signaling indicating a set of allowed network slices in response to the request.

Certain aspects provide a computer readable medium including instructions. The instructions, when executed by a processing system, cause the processing system to perform operations generally including receiving a request for a user equipment (UE) to connect to a set of network slices, wherein the request comprises at least one priority associated with at least one network slice in the set of network slices, selecting a core network function that supports the at least one network slice or another network slice in the set of network slices, and communicating the request to the selected core network function.

Certain aspects provide a computer readable medium including instructions. The instructions, when executed by a processing system, cause the processing system to perform operations generally including receiving a request for a user equipment (UE) to connect to a set of network slices, wherein the request comprises at least one priority associated with at least one network slice in the set of network slices, determining the at least one network slice or another network slice in the set of network slices can be supported by a network, based at least in part on the at least one priority, and communicating a response to the UE providing an indication of the determined at least one network slice or the other network slice.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
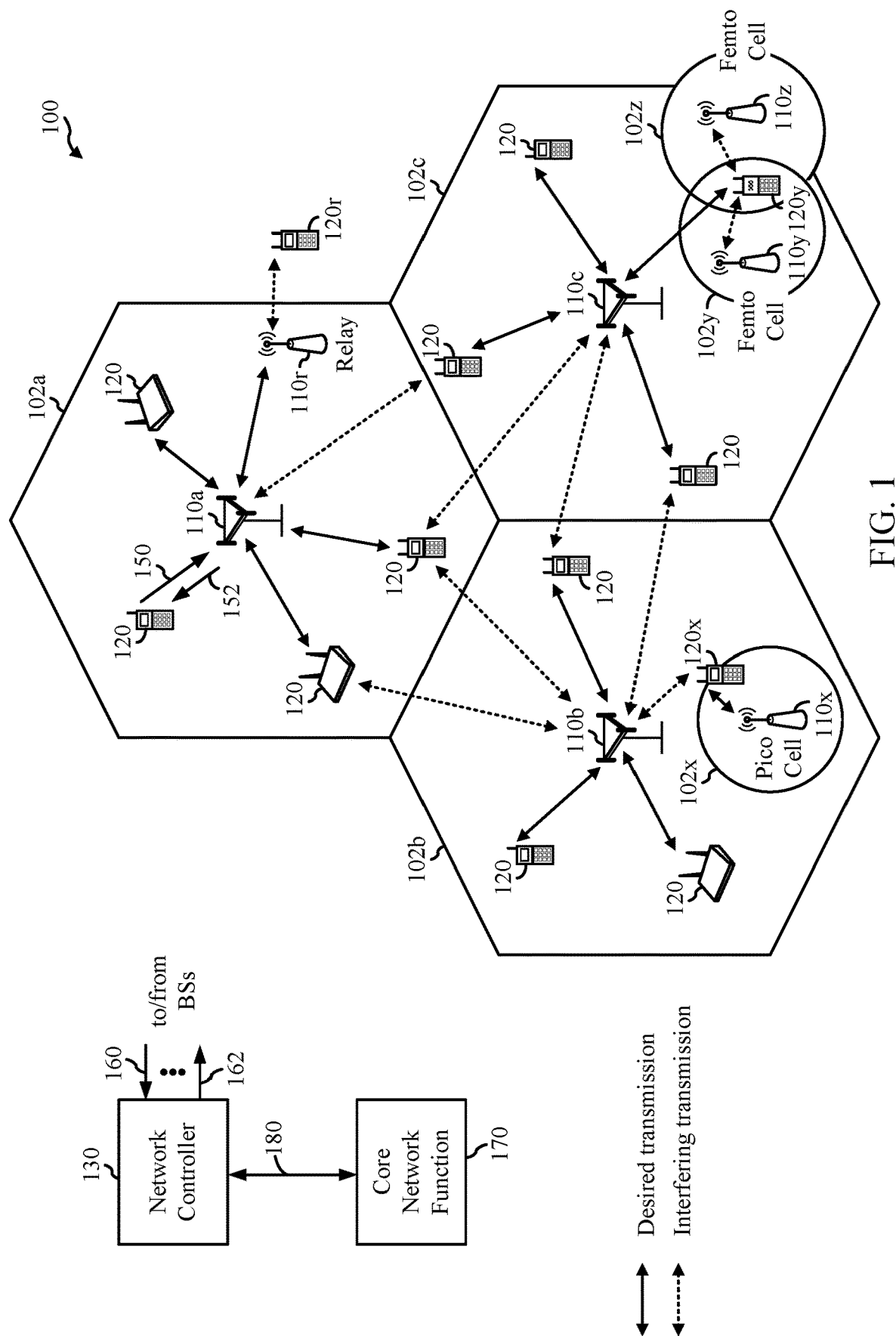
FIG. 1 is a block diagram conceptually illustrating an example telecommunications system, in accordance with certain aspects of the present disclosure.

Aspects of the present disclosure provide apparatus, methods, processing systems, and computer readable mediums for prioritizing incompatible network slices in wireless communications systems operating according to new radio (NR) (new radio access technology or 5G technology) technologies.

NR may support various wireless communication services, such as Enhanced mobile broadband (eMBB) targeting wide bandwidth (e.g. 80 MHz and larger), millimeter wave (mmW) targeting high carrier frequency (e.g. 27 GHz and higher), massive machine-type communications (mMTC) targeting non-backward compatible machine-type communications (MTC) techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed, for example, for prioritizing incompatible network slices, as described in greater detail below with reference to FIGS. 8-10. For example, one or more of the UEs 120 may perform the operations of sending a request 150 to connect to a set of network slices, wherein the request comprises at least one priority associated with at least one network slice in the set of network slices, and receiving a signal 152 indicating a set of allowed network slices in response to the request, as described in more detail with reference to FIG. 8. In a second example, the network controller 130 may perform the operations of receiving (e.g., via one of the BSs 110) a request 160 for a user equipment (UE), such as one of the UEs 120, to connect to a set of network slices, wherein the request comprises at least one priority associated with at least one network slice in the set of network slices, selecting a core network function 170 that supports the at least one network slice or another network slice in the set of network slices, and communicating, at 180, the request to the selected core network function. The selected core network function may be implemented within the network controller, or in one or more other devices of the network as described in more detail with reference to FIG. 9. In a third example, the network controller 130 may perform the operations of receiving (e.g., via one of the BSs 110) a request 160 for a user equipment (UE), such as any of the UEs 120, to connect to a set of network slices, wherein the request comprises at least one priority associated with at least one network slice in the set of network slices, determining the at least one network slice or another network slice in the set of network slices can be supported by a network, based at least in part on the at least one priority, and communicating a response 162 to the UE providing an indication of the determined at least one network slice or the other network slice, as described in more detail with reference to FIG. 10.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DUUL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover (HO), and/or measurement based on the indicated cell type.

Figure 2A:
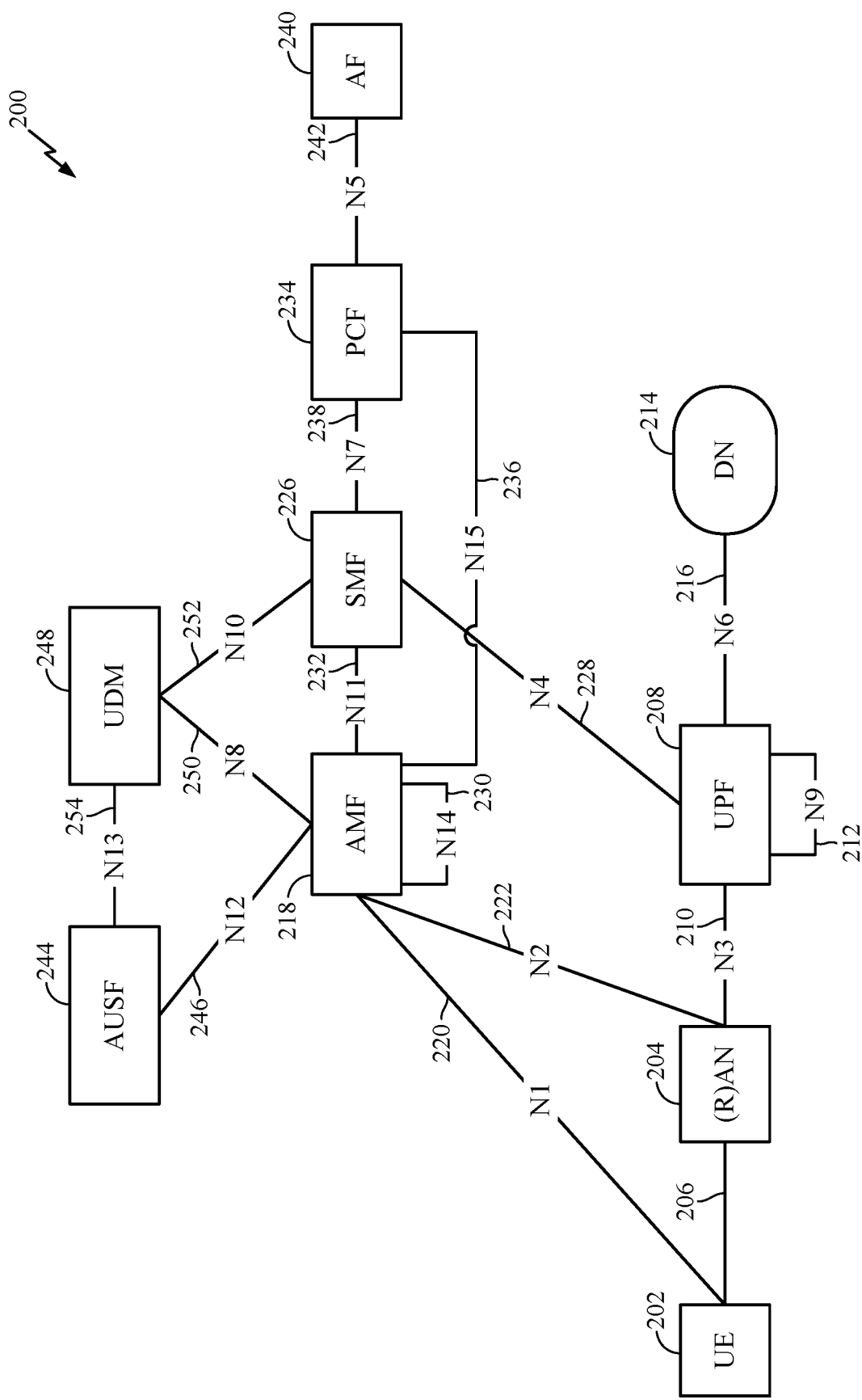
FIGS. 2A-2D are block diagrams illustrating example logical architectures of RANs, in accordance with certain aspects of the present disclosure.

FIG. 2A illustrates an example logical architecture 200 of a New Radio (NR) access network, which may be implemented in the wireless communication system illustrated in FIG. 1. A UE 202 may access a radio access network (RAN) 204 via an NR air interface 206. The RAN may communicate with a user plane function (UPF) 208 via an N3 interface 210. Communications between different UPFs 208 may be conveyed via an N9 interface 212. The UPFs may communicate with a data network (DN) (e.g., the Internet, network-operator-provided services) 214 via one or more N6 interfaces 216. The UE may communicate with one or more core access and mobility management functions (AMFs) 218 via an N1 interface 220. The RAN may communicate with the one or more AMFs via an N2 interface 222. The UPFs may communicate with a session management function (SMF) 226 via an N4 interface 228.

Communications between different AMFs 218 may be conveyed via an N14 interface 230. The AMFs may communicate with the SMF 226 via an N11 interface 232. The AMFs may communicate with a policy control function (PCF) 234 via an N15 interface 236. The SMF may communicate with the PCF via an N7 interface 238. The PCF may communicate with an application function (AF) 240 via an N5 interface 242. The AMFs may communicate with an authentication server function (AUSF) 244 via an N12 interface 246. The AMFs may communicate with a unified data management (UDM) 248 via an N8 interface 250. The SMF may communicate with the UDM via an N10 interface 252. The AUSF may communicate with the UDM via an N13 interface 254.

While the example architecture 200 illustrates a single UE, the present disclosure is not so limited, and the architecture may accommodate any number of UEs. Similarly, the architecture shows the UE accessing a single DN, but the present disclosure is not so limited, and the architecture accommodates a UE communicating with a plurality of DNs, as described below with reference to FIG. 2B.

Figure 2B:
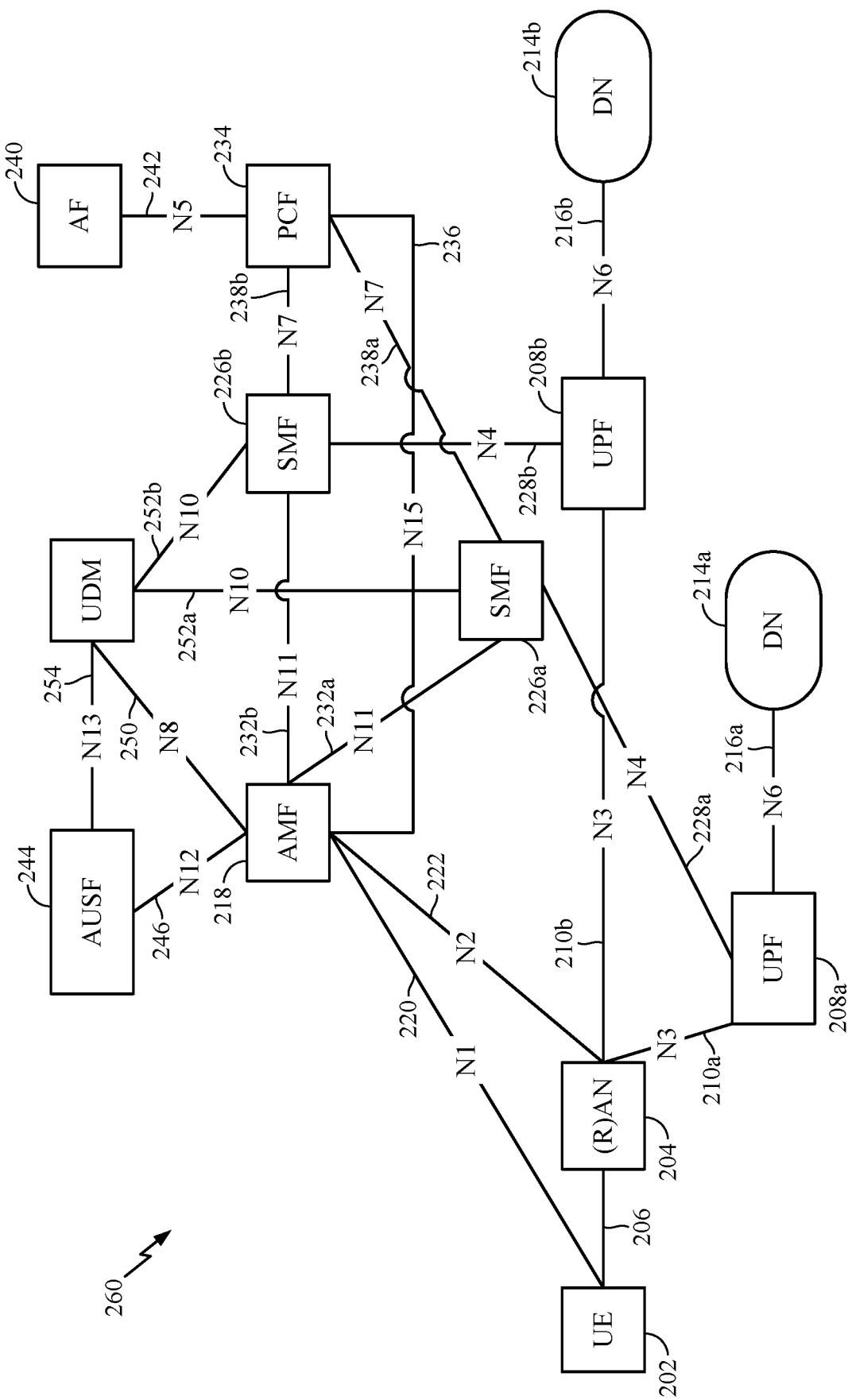

FIG. 2B illustrates an example logical architecture 260 of a New Radio (NR) access network (RAN), which may be implemented in the wireless communication system illustrated in FIG. 1. The logical architecture 250 is similar to the logical architecture 200 shown in FIG. 2A, with many of the same entities shown and labeled with the same labels. Thus, only differences from FIG. 2A will be described. The UE 202 in FIG. 2B is accessing two DNs, 214a and 214b, via the RAN 204. The RAN communicates with a first UPF 208a via a first N3 interface 210a. The RAN also communicates with a second UPF 208b via a second N3 interface 210b. Each UPF communicates with a corresponding DN 214a or 214b via a corresponding N6 interface 216a or 216b. Similarly, each UPF communicates with a corresponding SMF 226a or 226b via a corresponding N4 interface 228a or 228b. Each SMF communicates with the AMF 218 via a corresponding N11 interface 232a or 232b. Similarly, each SMF communicates with the PCF via a corresponding N7 interface 238a or 238b.

Figure 2C:
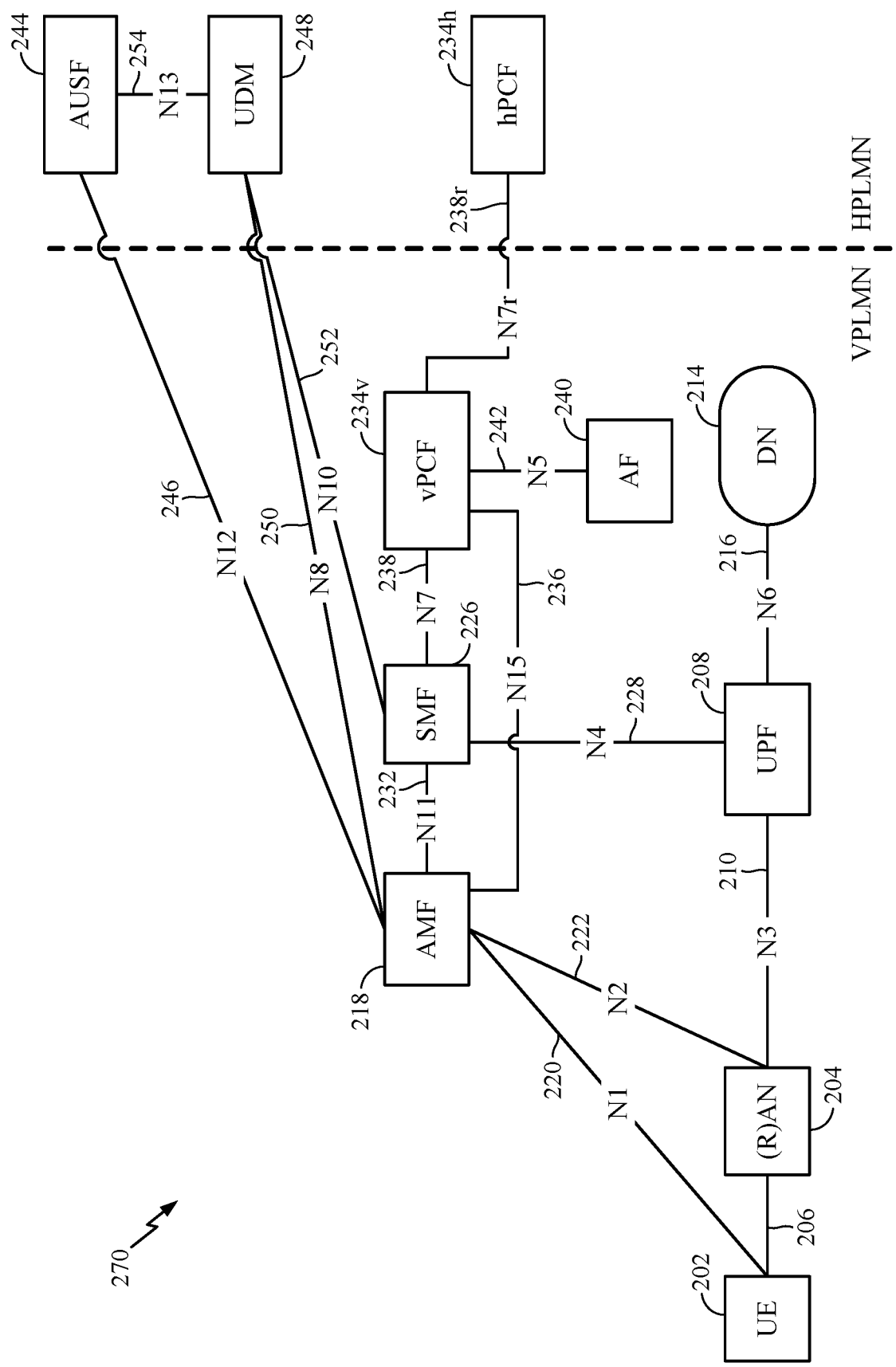

FIG. 2C illustrates an example logical architecture 270 of a New Radio (NR) access network (RAN), which may be implemented in the wireless communication system illustrated in FIG. 1. The logical architecture 270 is similar to the logical architecture 200 shown in FIG. 2A, with many of the same entities shown and labeled with the same labels. Thus, only differences from FIG. 2A will be described. In the logical architecture 270, the UE is roaming, and is therefore connected with the home physical land mobile network (HPLMN) of the UE via certain entities in the visited physical land mobile network (VPLMN). In particular, the SMF communicates with the VPLMN PCF (vPCF) 234v, but some policy information regarding the UE's access to the DN may be retrieved from the HPLMN PCF (hPCF) 234h via a roaming N7r interface 238r. In FIG. 2C, the UE is able to access the DN via the VPLMN.

Figure 2D:
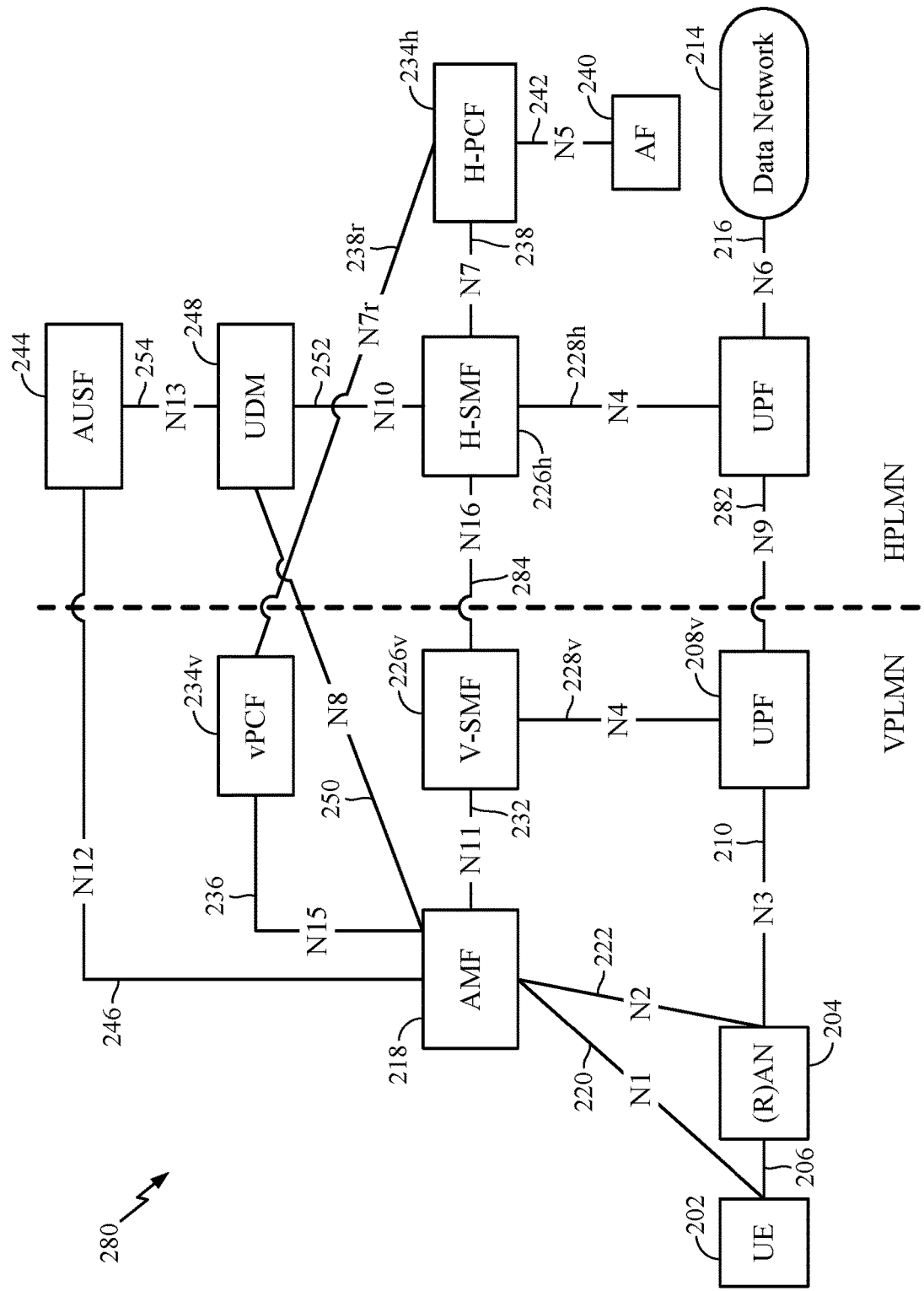

FIG. 2D illustrates an example logical architecture 280 of a New Radio (NR) access network (RAN), which may be implemented in the wireless communication system illustrated in FIG. 1. The logical architecture 280 is similar to the logical architecture 270 shown in FIG. 2C, with many of the same entities shown and labeled with the same labels. Thus, only differences from FIG. 2C will be described. In the logical architecture 280, the UE is roaming, and is therefore connected with the home physical land mobile network (HPLMN) of the UE via certain entities in the visited physical land mobile network (VPLMN). Unlike FIG. 2C, the UE in FIG. 2D is accessing a DN that the UE is not able to access via the VPLMN. Differences from FIG. 2C include that the UPF in the VPLMN communicates with the VPLMN SMF (V-SMF) 226v via an N4 interface 228v, while the UPF in the HPLMN communicates with the HPLMN SMF (H-SMF) 226h via an N4 interface 228h. The UPF of the VPLMN communicates with the UPF of the HPLMN via an N9 interface 282. Similarly, the V-SMF communicates with the H-SMF via an N16 interface 284.

Operations performed and protocols used by the various entities shown in the exemplary logical architectures 200, 250, 270, and 280 in FIGS. 2A-2D are described in more detail in documents "TS 23.501; System Architecture for the 5G System; Stage 2 (Release 15)" and "TS 23.502; Procedures for the 5G System; Stage 2 (Release 15)," both which are publicly available.

Figure 3:
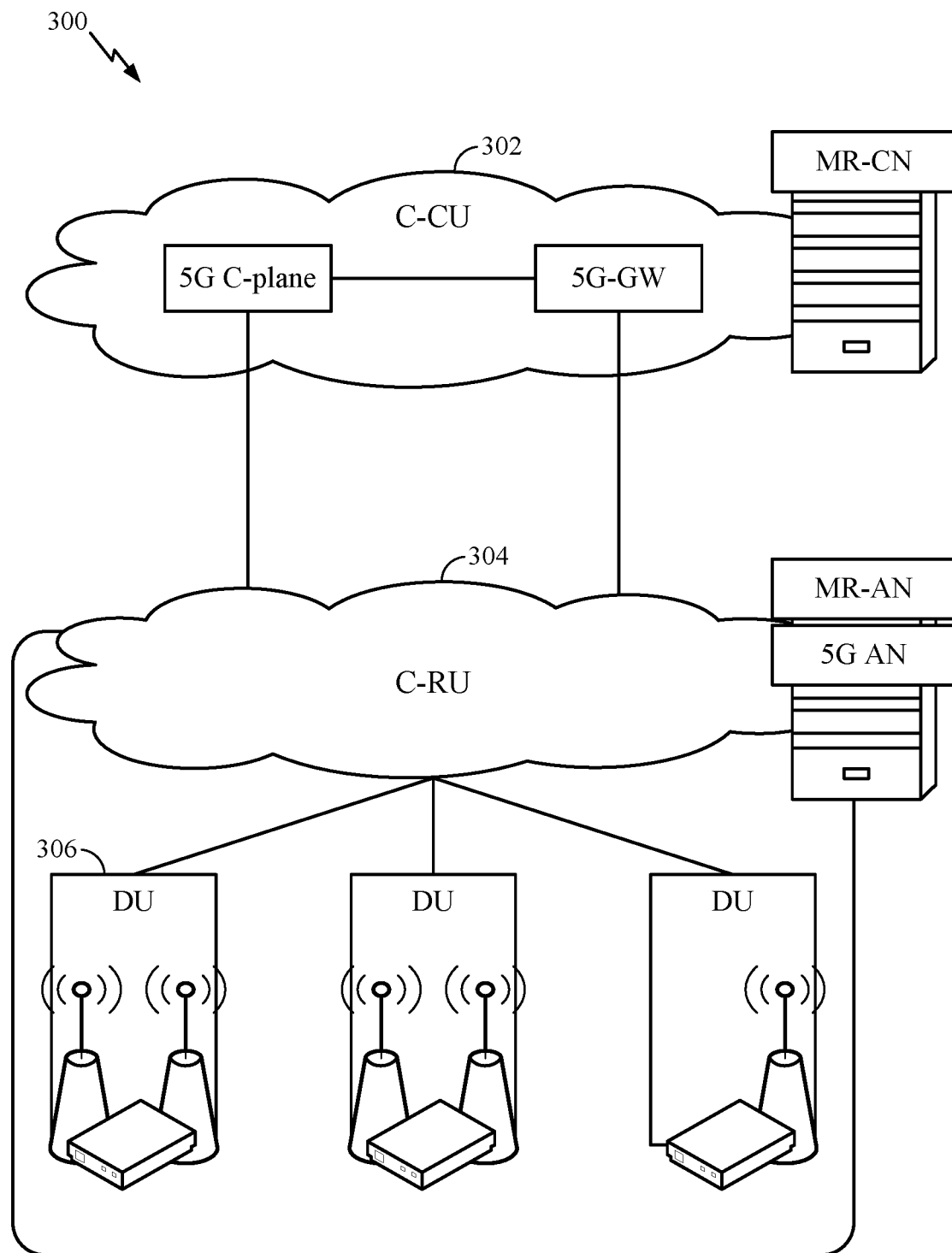
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more access network controller (ANC) functions. Optionally, the C-RU may host core network functions locally. The C-RU may have distributed deployment. The C-RU may be closer to the network edge.

A distributed unit (DU) 306 may host one or more TRPs (e.g., edge node (EN), an edge unit (EU), a radio head (RH), a smart radio head (SRH), or the like). The DU may be located at edges of the network with radio frequency (RF) functionality.

As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., C-CU 302) and/or one or more distributed units (e.g., one or more transmission and reception points (TRPs)).

Figure 4:
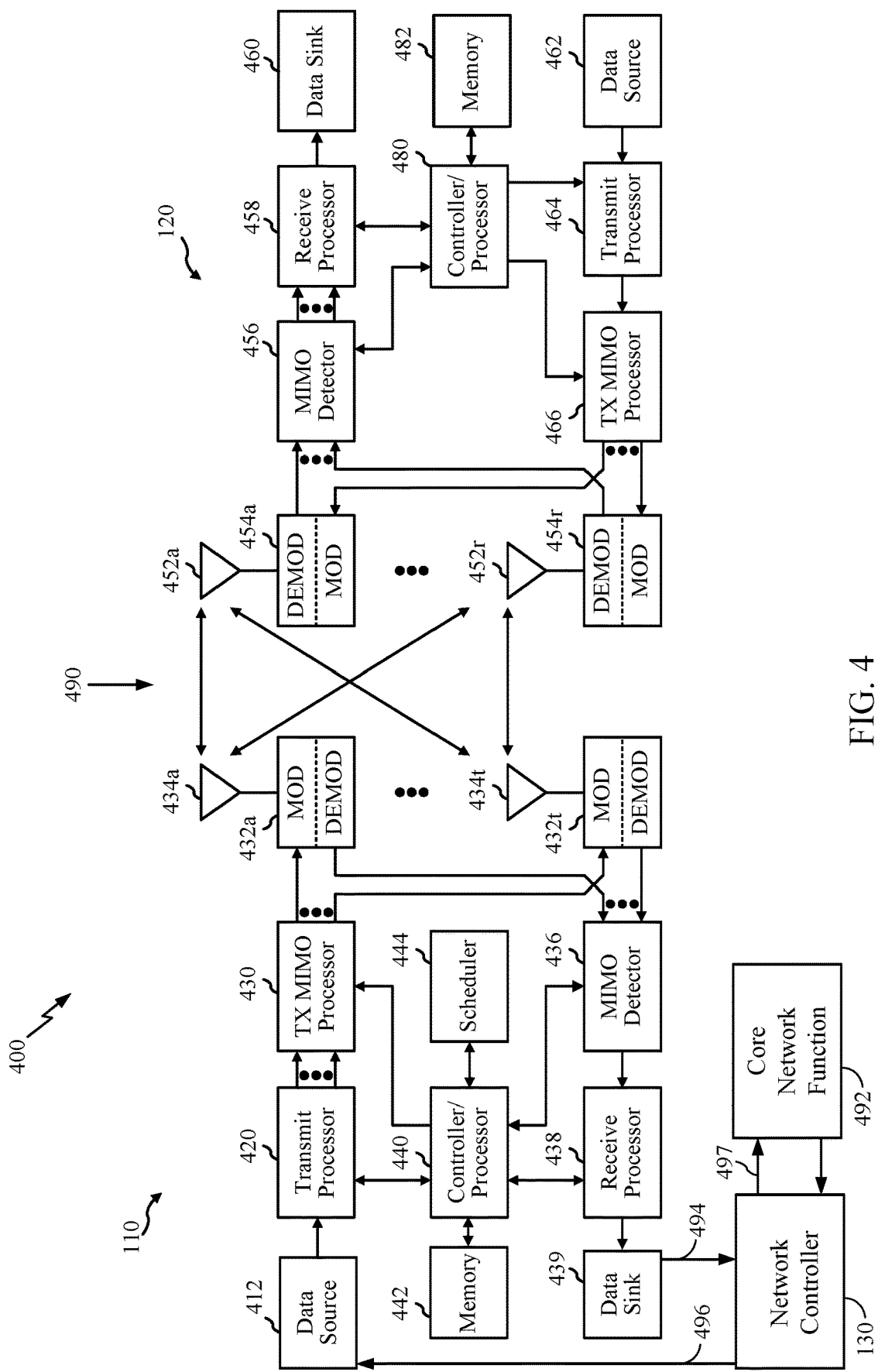
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8-10. For example, the UE 120 may perform the operations of sending a request, at 490, to connect to a set of network slices, wherein the request comprises at least one priority associated with at least one network slice in the set of network slices, and receiving a signal, at 490, indicating a set of allowed network slices in response to the request, as described in more detail with reference to FIG. 8. In the example, the controller/processor 480 of the UE may, by executing instructions obtained from the memory 482, generate the request and send it to the transmit processor 464 or direct the transmit processor 464 to generate the request. Still in the example, the controller/processor and/or transmit processor may cause the request to be transmitted at 490 via the TX MIMO processor 466, modulators 454a-454r, and antennas 452a-452r. In the example, the UE may receive signaling 490 indicating a set of allowed network slices in response to the request via antennas 452a-452r, demodulators 454a-454r, MIMO detector 456, receive processor 458 and controller/processor 480. Controller/processor 480 and/or receive processor 458 may execute instructions obtained from memory 482 in receiving the signaling.

Figure 9:
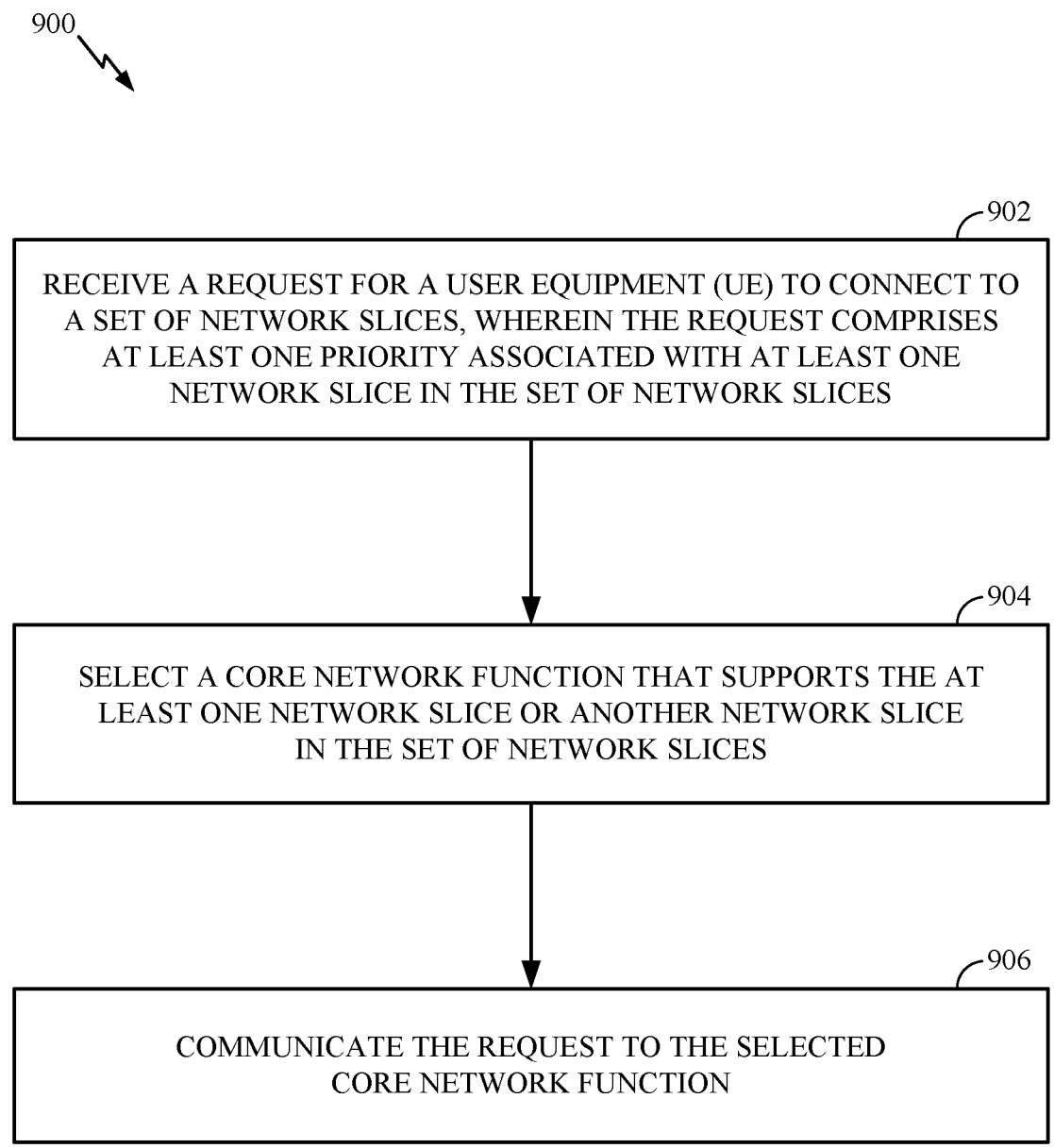
FIG. 9 illustrates example operations for wireless communications, in accordance with certain aspects of the present disclosure.

In another example, the network controller 130 may perform the operations of receiving a request at 494 for a user equipment (UE), such as one of the UEs 120, to connect to a set of network slices, wherein the request comprises at least one priority associated with at least one network slice in the set of network slices, selecting a core network function 492 that supports the at least one network slice or another network slice in the set of network slices, and communicating, at 497, the request to the selected core network function, as described below with reference to FIG. 9. The selected core network function may be, for example, an AMF, as described with reference to FIGS. 2A-D.

Figure 10:
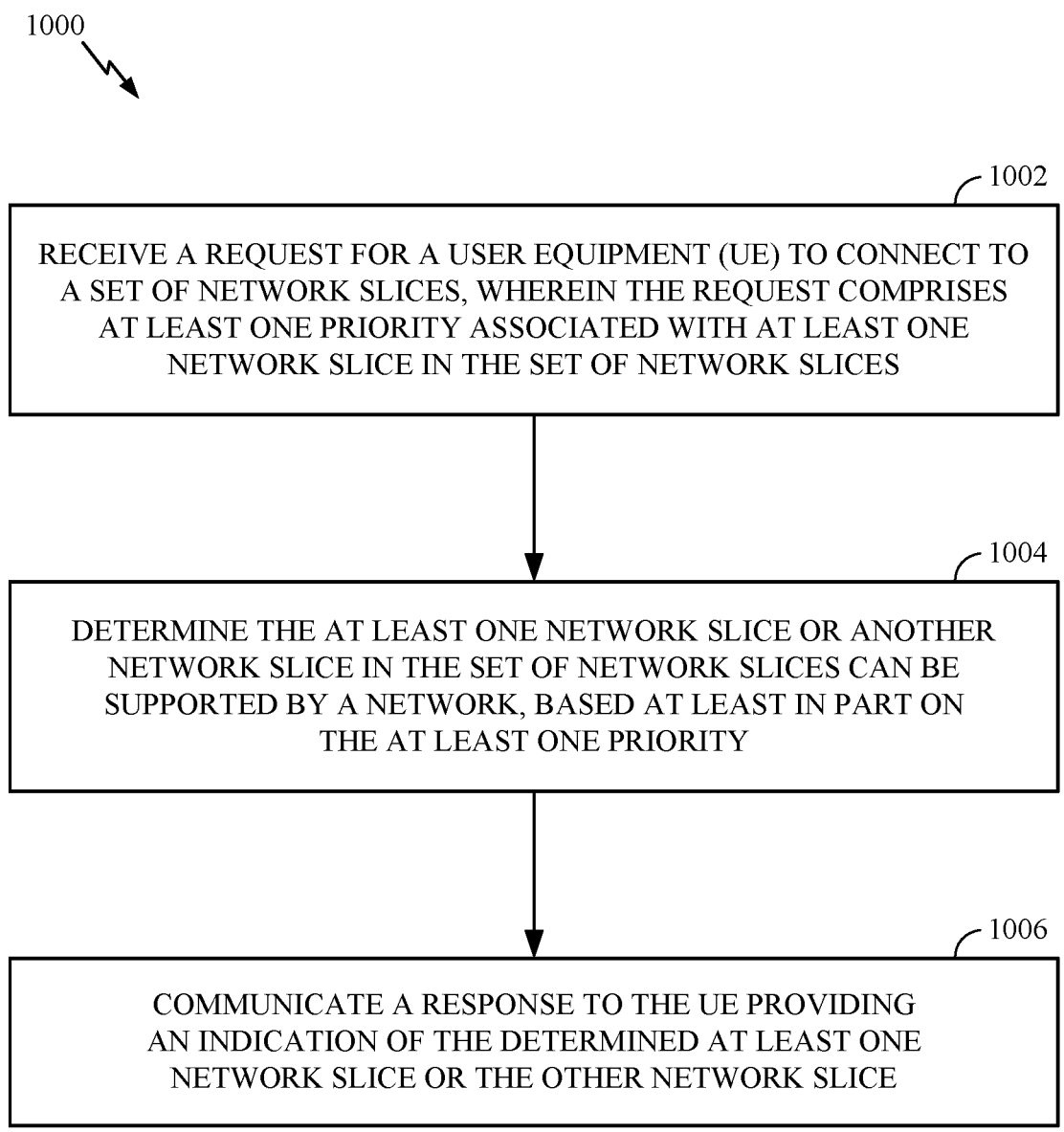
FIG. 10 illustrates example operations for wireless communications, in accordance with certain aspects of the present disclosure.

In yet another example, the network controller 130 may perform the operations of receiving a request 494 for a user equipment (UE), such as any of the UEs 120, to connect to a set of network slices, wherein the request comprises at least one priority associated with at least one network slice in the set of network slices, determining the at least one network slice or another network slice in the set of network slices can be supported by a network, based at least in part on the at least one priority, and communicating a response 496 to the UE (e.g., via the BS 110) providing an indication of the determined at least one network slice or the other network slice, as described in more detail with reference to FIG. 10.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via antennas 434a through 434t, respectively.

At the UE 120, antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIGS. 9-10, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
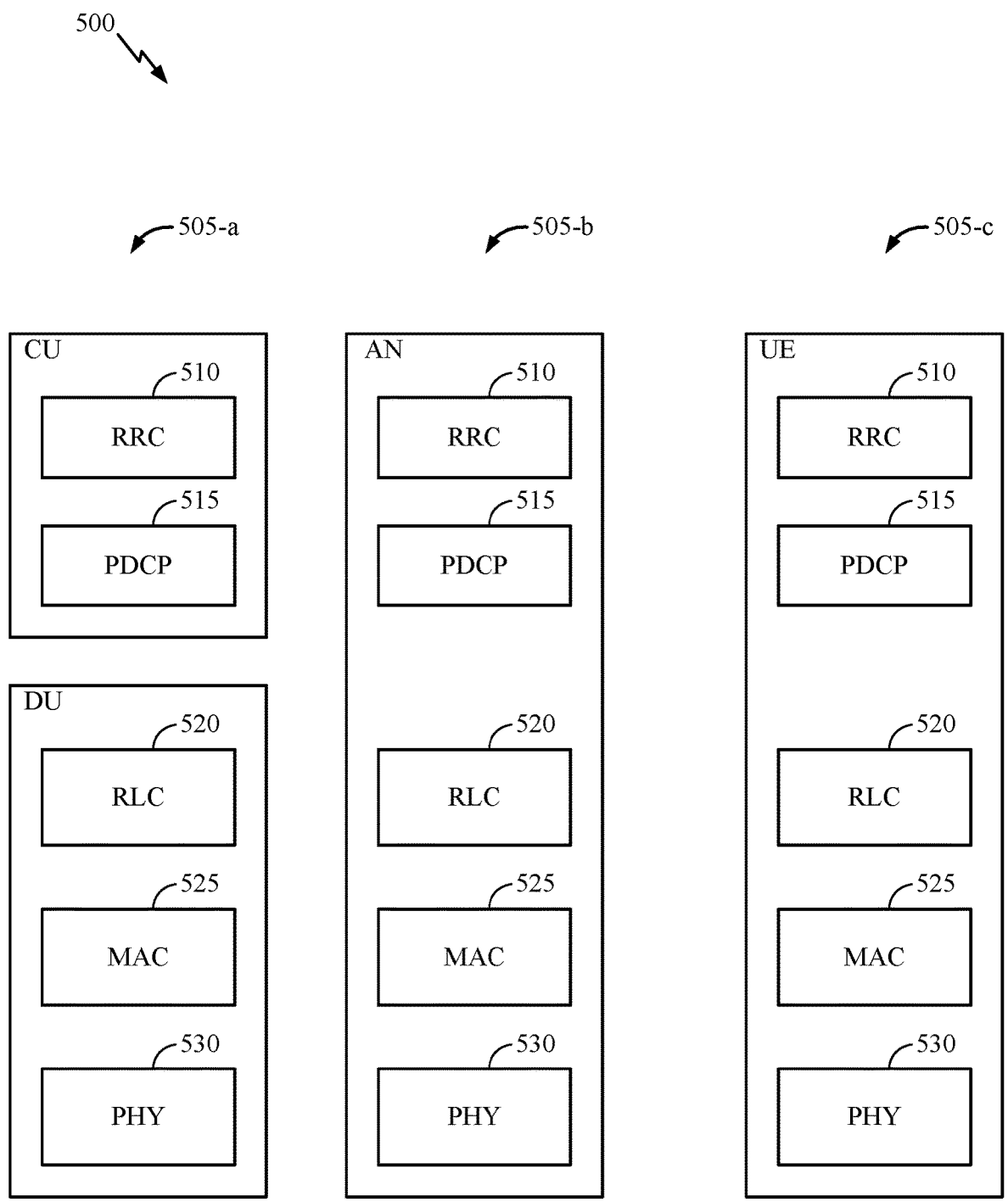
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or application specific integrated circuit (ASIC), portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack 505-c (e.g., the RRC layer 510, the PDCP layer 515, the RLC layer 520, the MAC layer 525, and the PHY layer 530).

Figure 6:
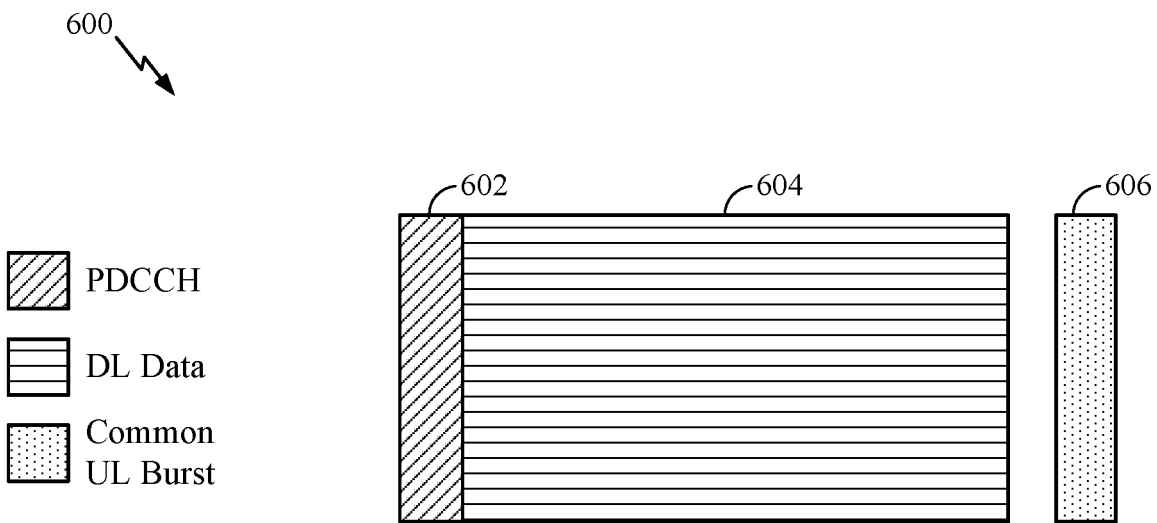
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an acknowledgment (ACK) signal, a negative acknowledgment (NACK) signal, a hybrid automatic retransmission request (HARQ) indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
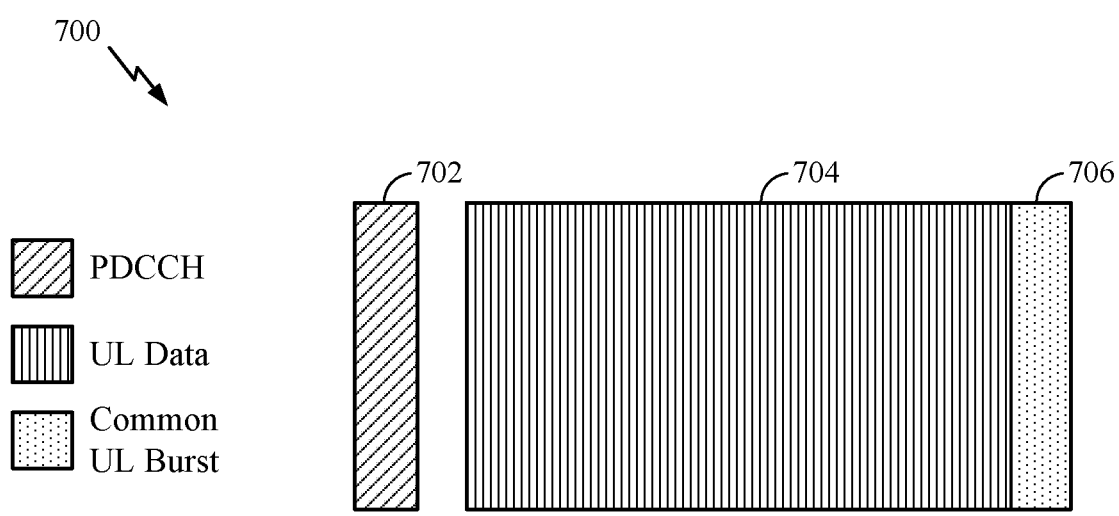
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an ANC, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

In aspects of the present disclosure, a network slice is a complete logical network that comprises a set of network functions and corresponding resources necessary to provide certain network capabilities and network characteristics. A network slice includes functions of both an access network (AN) and a core network (CN). A network slice instance (NSI) is the instantiation of a network slice, i.e. a deployed set of network functions delivering the intended network slice services according to a network slice template According to aspects of the present disclosure, a network slice comprises all of the control plane and user plane functionality and resources required to fulfill a particular service or set of services and may include: 1) core network control plane and user plane network functions, as well as their resources (in terms of compute, storage and network resources, including transport resources between the network functions); 2) a radio access network; and 3) in the case of a network slice supporting a roaming service, a VPLMN part and a HPLMN part.

In aspects of the present disclosure, network slices may differ for supported features and network functions. The operator may deploy multiple network slice instances delivering the same features to different groups of UEs, e.g. as the NSIs deliver different committed services and/or because one or more NSIs may be dedicated to one or more customers.

According to aspects of the present disclosure, a UE can simultaneously be served by one or more network slice instances via an AN. The AMF instance serving the UE logically belongs to each of the network slice instances serving the UE, i.e., the AMF instance is common to the network slice instances serving a UE.

In aspects of the present disclosure, AMF discovery and selection for a set of slices for a UE may be triggered by a first contacted AMF in a registration procedure, and AMF discovery and selection may lead to a change of AMF for a UE. SMF discovery and selection is initiated by the AMF when a session management (SM) message to establish a protocol data unit (PDU) session is received from the UE. The network repository function (NRF) may be used to assist the discovery and selection tasks.

According to aspects of the present disclosure, a PDU session belongs to one and only one specific network slice instance. Different network slice instances do not share a PDU session, though different slices may have slice-specific PDU sessions using the same DN.

According to aspects of the present disclosure, UE-related N2 and N1 signaling are handled by a set of common control network functions (CCNFs) that in a 5G system may be implemented in the AMF. A core network part of a network slice may share some network functions with other core network parts of network slices which serve the same UE, including the N1 and N2 terminations, in the CCNF. As used herein, a core network part of a network slice may be referred to as a core network (or CN) slice, and a radio network part of a network slice may be referred to as a RAN slice.

In aspects of the present disclosure, once a UE is assigned to a CCNF during the attach procedure, a signaling connection between the UE and the CCNF is based on the UE temporary identifier (ID), i.e. the RAN part of the network slice routes UE signaling to the CCNF based on a temporary ID the UE provides in RRC signaling. The CCNF is logically part of all network slice instances (NSIs) that are being used for the UE. So when a new NSI is added to or an existing NSI is removed from a set of slices used by a UE, a more optimal CCNF may have to be selected to serve the new set of NSIs used for the UE, thus triggering a CCNF redirection procedure. Prior to the UE being assigned to a Serving CCNF during the attach procedure (e.g., due to the processing of the network policy or subscription policy), signaling from the UE may be first routed by the RAN to a default CCNF based on a RAN routing policy, if the UE does not have a temporary ID, yet.

According to aspects of the present disclosure, a network slice: 1) offers a UE particular system behaviors tailored to specific application needs, from the standpoint of specific control plane (e.g., a UE may not need MTC procedures, or require optimal behavior for massive MTC, or critical communications, etc.) or user plane behaviors (e.g. the UE may need a slice supporting header compression); and 2) offers a UE access to resources allocated for a specific service, application domain, or tenant (e.g. a minimum level of guaranteed resources or aggregate number of subscribers allowed to access the service at any point in time). In aspects of the present disclosure, a tenant represents an organization, agency, application (or application class), or business entity which is entitled to access the service for the use of guaranteed network resources through a predefined service level agreements and/or policy with the network operator.

For example, a tenant of PLMN resource may be a wholesale customer of the PLMN (e.g. a big company, or an agency which requires the PLMN to provide at least access to a predefined set of resources, or some specific policies in handling slice subscribers of the agency at times of congestion). A PLMN may apply tenant-specific policies at times of overload. An example of a tenant may be some public safety agency. The tenancy concept may also be used to meet application specific requirements. For example, an enterprise may deploy a factory-floor set of devices and a set of devices that are associated to non-factory-floor operations. The enterprise may have a policy to allocate at least 60% of network resources (whether in the RAN or in the core network) to factory floor operation at times of congestion but not to segregate resources at all times. In the example, the enterprise may set up a tenanted slice such that factory floor devices get at least 60% of resources at times of congestion.

In aspects of the present disclosure, at least two dimensions of a network slice can identify a slice via a single network slice selection assistance information (S-NSSAI) that identifies the network slice.

According to aspects of the present disclosure, an S-NSSAI may comprise: 1) a slice/service type (SST), which refers to the expected network slice behavior in terms of features and services (e.g., eMBB service, critical communications (CriC), mMTC or other behaviors which may also be operator specific); and 2) a slice differentiator (SD), which is optional information that complements the Slice/Service type(s) to allow further differentiation for selecting a network slice instance from the one or more network slice instances that all comply with the indicated Slice/Service type.

In aspects of the present disclosure, an S-NSSAI can have standard values or PLMN-specific values. An S-NSSAI with PLMN-specific values is associated to the PLMN ID of the PLMN that assigns the S-NSSAI. An S-NSSAI may not be used by a UE in access stratum procedures in any PLMN other than the PLMN to which the S-NSSAI is associated.

According to aspects of the present disclosure, an NSSAI is a collection of Single Network Slice Selection Assistance Informations (S-NSSAIs). Each S-NSSAI may be used by the network to assist in selecting a particular network slice instance (NSI). The CN part of a network slice instance(s) serving a UE is selected by CN.

In aspects of the present disclosure, an NSSAI can be PLMN-specific or standardized. When an NSSAI is PLMN-specific, a UE may store the PLMN ID of the PLMN that assigns the NSSAI. The UE may not use this NSSAI outside the PLMN that assigns the NSSAI as the NSSAI identifies a PLMN-specific slice that may not be available elsewhere.

According to aspects of the present disclosure, a standardized NSSAI may be used in all PLMNs. Federations of PLMNs may agree on common values of S-NSSAIs and support the same slice types.

In aspects of the present disclosure, a core network receiving an NSSAI in NAS signaling or in RAN-CN signaling may handle incoming NAS signaling in accordance with policies specific to each S-NSSAI. The NSSAI may also allow the core network to understand which NSI or set of NSIs that a UE may request to be selected at attach time, out of a subscribed set of S-NSSAIs (if available) applicable to the PLMN.

Example Prioritizing Incompatible Network Slices

Some wireless systems (e.g., 5G systems, eMBB systems) support network slicing. In a system supporting network slicing, a UE may be configured with a list, which may be referred to as a Network Slice Selection Assistance Information (NSSAI), of slices supported. Each slice may be identified by a Single NSSAI (S-NSSAI), containing a slice/service type and a slice differentiator. When the UE provides an NSSAI to the network to indicate to which slices the UE wishes to connect, the network sometimes may not be able to select an AMF that supports all of the S-NSSAIs in the NSSAI provided by the UE (e.g., the network may have one or more AMFs, dedicated to a specific S-NSSAI, which do not support other S-NSSAIs).

Depending on the types of services to which the UE requires access, the network may select S-NSSAIs, from S-NSSAIs supported by the network, based on a subscription of the UE and network policies that the network will support for the UE. The network may then select an AMF with which to support the UE, based on the selected S-NS- SAIs. Some S-NSSAIs configured in the UE may be required by the UE, depending on the type of connectivity required by the UE, i.e., based on the UE subscription. Some S-NSSAIs may not be required but may have a higher priority than other S-NSSAIs.

As used herein, an "allowed NSSAI" is an NSSAI provided (to a UE) by a serving PLMN during a registration procedure, indicating the NSSAI allowed by the network in the serving PLMN for the current registration area.

As used herein, a "configured NSSAI" is an NSSAI that has been provisioned in a UE. The NSSAI may be said to be configured in the UE.

As used herein, a "requested NSSAI" is an NSSAI that a UE provides to the network when performing a regret matching (RM) procedure.

According to aspects of the present disclosure, an S-NSSAI may comprise: 1) a slice/service type (SST), as mentioned above, which refers to the expected Network Slice behavior in terms of features and services; 2) a slice differentiator (SD), as mentioned above, which is optional information that complements the SST(s) to allow further differentiation for selecting a network slice instance from the one or more network slice instances that comply with the indicated SST; and 3) an optional S-NSSAI Priority, which identifies the priority of a specific S-NSSAI with respect to other S-NSSAI.

In aspects of the present disclosure, an S-NSSAI priority may indicate that the S-NSSAI is required or may provide a relative priority value with respect to the priority of other S-NSSAIs.

According to aspects of the present disclosure, when a network determines a conflict between S-NSSAIs in an NSSAI and cannot support all of the S-NSSAIs that are both supported by the network and allowed by the subscription (e.g., because no AMF can be selected that supports all of the S-NSSAIs), the AMF may use the S-NSSAI priority to select which S-NSSAI(s) shall be supported for the UE and for which a value shall be returned in the accepted NSSAI. The network may then select an AMF that supports the selected S-NSSAI(s).

In aspects of the present disclosure, some S-NSSAIs configured in a UE may be required by the UE, depending on the type of connectivity required by the UE, based on the UE subscription. Some S-NSSAIs may not be required but may have a higher priority than other S-NSSAIs.

According to aspects of the present disclosure, the S-NSSAI priority value may be set by the network when providing the configured NSSAI(s) to the UE.

In aspects of the present disclosure, a UE may modify an S-NSSAI priority. For example, a UE may modify an S-NSSAI priority, based on services and/or applications activated by a user in the UE.

According to aspects of the present disclosure, if the NSSAI provided by the UE contains one or more S-NSSAI (s) whose priority is set to required, the network may prioritize selecting an AMF that supports the one or more S-NSSAI(s) whose priority is set to required, even if this means other S-NSSAIs in the NSSAI provided by the UE cannot be supported.

In aspects of the present disclosure, after considering an S-NSSAI(s) whose priority is set to required, the network may give priority to other S-NSSAIs having higher relative priority values.

Figure 8:
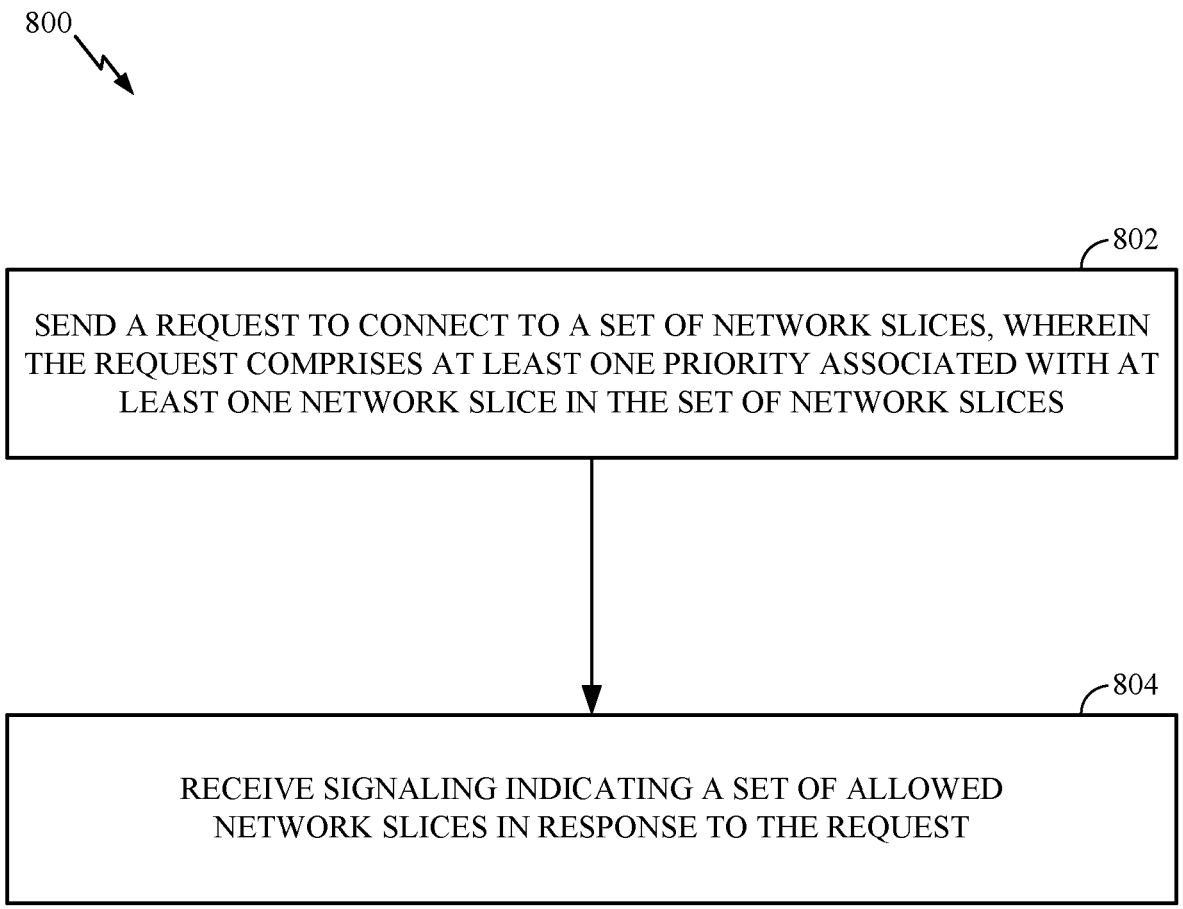
FIG. 8 illustrates example operations for wireless communications, in accordance with aspects of the present disclosure.

FIG. 8 illustrates example operations 800 for wireless communications, in accordance with aspects of the present disclosure. Operations 800 may be performed by a UE, for example, UE 120, shown in FIG. 1.

Operations 800 begin, at block 802, with the UE sending a request to connect to a set of network slices, wherein the request comprises at least one priority associated with at least one network slice in the set of network slices.

At block 804, operations 800 continue with the UE receiving signaling indicating a set of allowed network slices in response to the request.

FIG. 9 illustrates example operations 900 for wireless communications, in accordance with aspects of the present disclosure. Operations 900 may be performed by a core network entity, such as network controller 130 shown in FIG. 1, and/or a C-CU, such as C-CU 302 shown in FIG. 3.

Operations 900 begin, at block 902, with the core network entity receiving a request for a user equipment (UE) to connect to a set of network slices, wherein the request comprises at least one priority associated with at least one network slice in the set of network slices.

At block 904, operations 900 continue with the core network entity selecting a core network function that supports the at least one network slice or another network slice in the set of network slices.

Operations 900 continue at block 906 with the core network entity communicating the request to the selected core network function.

FIG. 10 illustrates example operations 1000 for wireless communications, in accordance with aspects of the present disclosure. Operations 1000 may be performed by a core network entity of a network, such as network controller 130 shown in FIG. 1, and/or a C-CU, such as C-CU 302 shown in FIG. 3.

Operations 1000 begin, at block 1002, with the core network entity of a network receiving a request for a user equipment (UE) to connect to a set of network slices, wherein the request comprises at least one priority associated with at least one network slice in the set of network slices.

At block 1004, operations 1000 continue with the core network entity determining the at least one network slice or another network slice in the set of network slices can be supported by a network, based at least in part on the at least one priority.

Operations 1000 continue at block 1006 with the core network entity communicating a response to the UE providing an indication of the determined at least one network slice or the other network slice.

When a UE provides an NSSAI to a network (e.g., requesting a set of network slices, as in block 802 in FIG. 8), the network may not be able to select an AMF that supports all the S-NSSAIs in the NSSAI provided by the UE (e.g. the network may have AMFs dedicated to a specific S-NSSAI and that do not support other S-NSSAIs).

Depending on the type of services to which the UE requires access, the network may need to select which S-NSSAIs (in the NSSAI provided by the UE) that are allowed by the network, based on subscription and policies, that the network will support for the UE (e.g., selecting a core network function that supports at least one network slice in the set of network slices as in block 904 in FIG. 9, determining at least one network slice in the set of network slices that can be supported by the network as in block 1004 in FIG. 10). The network may then select an AMF, based on the S-NSSAIs the network has selected to support.

Some S-NSSAIs configured in the UE may be required by the UE, depending on the type of connectivity required by the UE based on the UE subscription. Some S-NSSAIs may not be required but may have a higher priority than other S-NSSAIs.

When the network determines a conflict between the S-NSSAIs in the NSSAI and cannot support all of the S-NSSAIs that are both supported by the network and allowed by the subscription (e.g., because no AMF can be selected that supports all such S-NSSAIs), the AMF uses the S-NSSAI Priority to select which S-NSSAI(s) will be supported for the UE and for which a value shall be returned in the Accepted NSSAI (e.g., determining at least one network slice in the set of network slices that can be supported by the network as in block 1004 in FIG. 10). The network then selects an AMF that support such S-NSSAI(s).

The S-NSSAI Priority value may be set by the network when the network provides the configured NSSAI(s) to the UE (e.g., communicating a response to the UE providing an indication of the determined at least one network slice, as in block 1006 in FIG. 10, which the UE receives in a signal indicating a set of allowed network slices in response to the request, as in block 804 in FIG. 8). Additionally or alternatively, the UE may modify the priority based on, e.g., the services and/or applications activated in a UE by a user of the UE.

If the NSSAI provided by the UE contains S-NSSAI(s) whose priority is set to "required", the network may give priority to selecting an AMF that supports such S-NSSAI(s), even if this means other S-NSSAIs in the NSSAI provided by the UE cannot be supported. After considering an S-NSSAI(s) whose priority is set to "required," the network may give priority to other S-NSSAIs having higher relative priority values.

According to aspects of the present disclosure, if a UE receives a response to a request for network slices (e.g., as in block 804 of FIG. 8) that indicates that some of the S-NSSAIs requested by the UE are not allowed by a current serving network of the UE, then the UE may determine whether to accept the allowed S-NSSAIs and remain connected with the current serving network or whether to search for a new serving network among the available serving networks, based on priorities associated with the requested S-NSSAIs. For example, if a UE indicates two S-NSSAIs are "required" and the current serving network of the UE does not include one of the two S-NSSAIs in the allowed NSSAI, then the UE may search for a new serving network to join.

In aspects of the present disclosure, a UE may receive a rejection from a current serving network in response to a request for network slices. The UE may then attempt to reselect to a new serving network.

According to aspects of the present disclosure, an access node or other BS may select a core network function that supports at least one network slice in a set of requested network slices (e.g., as in block 904 in FIG. 9) based on one or more priorities associated with at least one network slice in the set of requested network slices. For example, an access node may receive a request from a UE for a set of S-NSSAIs that indicates one S-NSSAI that is required and three other S-NSSAIs that are not required. In the example, the access node may select a core network function (e.g., an AMF) that supports the required S-NSSAI and none of the other S-NSSAIs, if the access node does not have information regarding any core network functions that support the required S-NSSAI and at least one of the other S-NSSAIs. Still in the example, the access node may signal the selected core network function to the UE.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for sending, means for communicating, and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, means for determining, means for selecting, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, the instructions may include instructions for performing the operations described herein and illustrated in FIGS. 8-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications performed by a user equipment (UE), comprising:
    sending a request to connect to a set of network slices, wherein the request comprises at least one priority associated with at least one network slice in the set of network slices;
    receiving signaling indicating a set of allowed network slices in response to the request; and
    determining, based on the set of allowed network slices, whether to remain connected with a current serving network or to reselect to a new serving network.

2. The method of claim 1, wherein the at least one priority associated with the at least one network slice indicates the at least one network slice is required by the UE.

3. The method of claim 1, wherein:
    the set of network slices comprises a first network slice and a second network slice; and
    the at least one priority indicates that the first network slice has a higher priority than the second network slice.

4. The method of claim 1, wherein:
    the at least one priority associated with the at least one network slice indicates the at least one network slice is required by the UE;
    the set of allowed network slices does not include the at least one network slice; and
    determining, based on the set of allowed network slices, whether to remain connected with the current serving network or to reselect to the new serving network comprises determining not to remain connected with the current serving network; and the method further comprises:
    searching for the new serving network, different from the current serving network.

5. The method of claim 1, wherein the signaling indicates a rejection of the UE and the method further comprises:
    searching for a network in response to receiving the signaling.

6. A method for wireless communications by a core network entity, comprising:
    receiving a request for a user equipment (UE) to connect to a set of network slices comprising a first network slice and a second network slice, wherein the request comprises at least one priority that indicates that the first network slice is required by the UE and the second network slice is optional to the UE;
    determining the first network slice and zero or more other network slices in the set of network slices can be supported by a network, based at least in part on the at least one priority; and
    communicating a response to the UE providing an indication of the first network slice, the zero or more other network slices, and that the network supports the first network slice.

7. The method of claim 6, wherein:
    the determining comprises determining that the network does not support the second network slice; and
    the indication indicates the network does not support the second network slice.

8. The method of claim 6, wherein:
    the at least one priority indicates that the first network slice has a higher priority than the second network slice; and
    the determining comprises determining the first network slice can be supported by the core network entity.

9. The method of claim 8, wherein:
    the determining comprises determining that the network does not support the second network slice; and
    the indication indicates the network supports the first network slice and does not support the second network slice.

10. The method of claim 6, further comprising:
    selecting a core network function that supports the first network slice and the zero or more other network slices in the set of network slices; and
    communicating the request to the selected core network function.

11. The method of claim 10, wherein the selecting is based on the at least one priority.

12. The method of claim 10, wherein the selecting comprises selecting the core network function that supports the required first network slice.

13. The method of claim 12, wherein the selecting further comprises selecting the core network function that does not support at least one other network slice in the set of network slices.

14. The method of 12, wherein:
    the at least one priority indicates that the first network slice has a higher priority than the second network slice.

15. An apparatus for wireless communications, comprising:
    a processor configured to:
        cause the apparatus to send a request to connect to a set of network slices, wherein the request comprises at least one priority associated with at least one network slice in the set of network slices;
        cause the apparatus to receive signaling indicating a set of allowed network slices in response to the request; and
        determine, based on the set of allowed network slices, whether to remain connected with a current serving network or to reselect to a new serving network; and
    a memory coupled with the processor.

16. The apparatus of claim 15, wherein the at least one priority associated with the at least one network slice indicates the at least one network slice is required by the apparatus.

17. The apparatus of claim 15, wherein:
    the set of network slices comprises a first network slice and a second network slice; and
    the at least one priority indicates that the first network slice has a higher priority than the second network slice.

18. The apparatus of claim 15, wherein:
    the at least one priority associated with the at least one network slice indicates the at least one network slice is required by the apparatus;
    the set of allowed network slices does not include the at least one network slice; and
    the processor is further configured to:
        determine, based on the set of allowed network slices, whether the apparatus should remain connected with the current serving network or reselect to the new serving network by determining not to remain connected with the current serving network; and cause the apparatus to search for the new serving network, different from the current serving network.

19. The apparatus of claim 15, wherein the signaling indicates a rejection of the apparatus and the processor is further configured to:

cause the apparatus to search for a network in response to receiving the signaling.

20. An apparatus for wireless communications, comprising:

a processor configured to:
cause the apparatus to receive a request for a user equipment (UE) to connect to a set of network slices comprising a first network slice and a second network slice, wherein the request comprises at least one priority that indicates that the first network slice is required by the UE and the second network slice is optional to the UE;
determine the first network slice and zero or more other network slices in the set of network slices can be supported by a network, based at least in part on the at least one priority; and
cause the apparatus to communicate a response to the UE providing an indication of the first network slice, the zero or more other network slices, and that the network supports the first network slice; and a memory coupled with the processor.

21. The apparatus of claim 20, wherein:
the processor is configured to:
determine the at least one network slice or another network slice in the set of network slices can be supported by the network by determining that the network does not support the second network slice; and
communicate in the indication that the network does not support the second network slice.

22. The apparatus of claim 20, wherein:
the at least one priority indicates that the first network slice has a higher priority than the second network slice; and
the processor is configured to:
determine the first network slice can be supported by the apparatus.

23. The apparatus of claim 22, wherein the processor is configured to:
determine that the network does not support the second network slice; and
communicate in the indication that the network does not support the second network slice.

24. The apparatus of claim 20, wherein the processor is configured to:
select a core network function that supports the first network slice and the zero or more other network slices in the set of network slices; and
cause the apparatus to communicate the request to the selected core network function.

25. The apparatus of claim 24, wherein the processor is configured to select the core network function based on the at least one priority.

26. The apparatus of claim 24, wherein the processor is configured to select the core network function by selecting the core network function that supports the first network slice.

27. The apparatus of claim 26, wherein the processor is further configured to select the core network function by selecting the core network function that does not support at least one other network slice in the set of network slices.

28. The apparatus of claim 24, wherein:
the at least one priority indicates that the first network slice has a higher priority than the second network slice.

29. An apparatus for wireless communications, comprising:
means for sending a request to connect to a set of network slices, wherein the request comprises at least one priority associated with at least one network slice in the set of network slices;
means for receiving signaling indicating a set of allowed network slices in response to the request; and
means for determining, based on the set of allowed network slices, whether to remain connected with a current serving network or to reselect to a new serving network.

30. An apparatus for wireless communications, comprising:
means for receiving a request for a user equipment (UE) to connect to a set of network slices comprising a first network slice and a second network slice, wherein the request comprises at least one priority that indicates that the first network slice is required by the UE and the second network slice is optional to the UE;
means for determining the first network slice and zero or more other network slices in the set of network slices can be supported by a network, based at least in part on the at least one priority; and
means for communicating a response to the UE providing an indication of the first network slice, the zero or more other network slices, and that the network supports the first network slice.

31. A non-transitory computer readable medium including instructions that, when executed by a processing system, cause the processing system to perform operations comprising:
sending a request to connect to a set of network slices, wherein the request comprises at least one priority associated with at least one network slice in the set of network slices;
receiving signaling indicating a set of allowed network slices in response to the request; and
determining, based on the set of allowed network slices, whether to remain connected with a current serving network or to reselect to a new serving network.

32. A non-transitory computer readable medium including instructions that, when executed by a processing system, cause the processing system to perform operations comprising:
receiving a request for a user equipment (UE) to connect to a set of network slices comprising a first network slice and a second network slice, wherein the request comprises at least one priority that indicates that the first network slice is required by the UE and the second network slice is optional to the UE;
determining the first network slice and zero or more other network slices in the set of network slices can be supported by a network, based at least in part on the at least one priority; and
communicating a response to the UE providing an indication of the first network slice, the zero or more other network slices, and that the network supports the first network slice.

* * * * *